Dec. 24, 1957 R. B. BARRETT 2,817,606
CLEANING PROCESS
Filed March 1, 1955
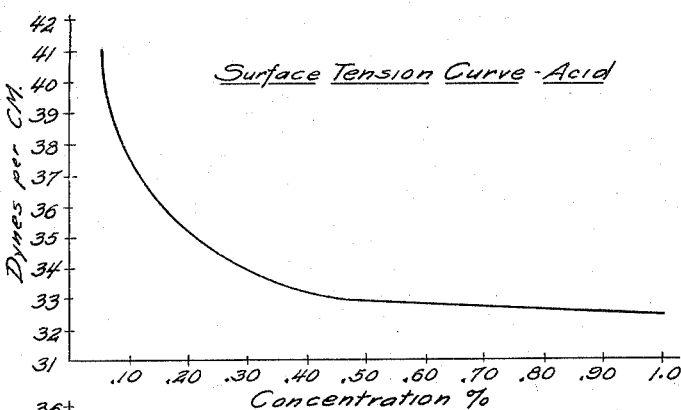
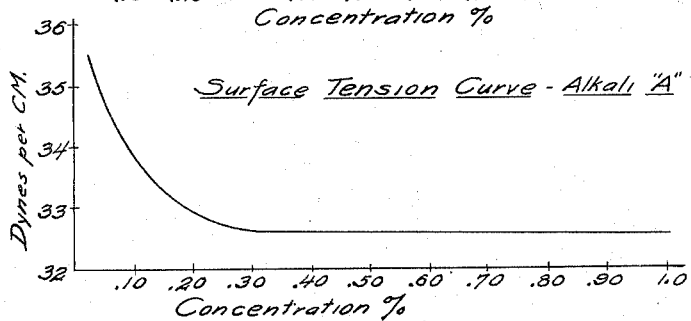
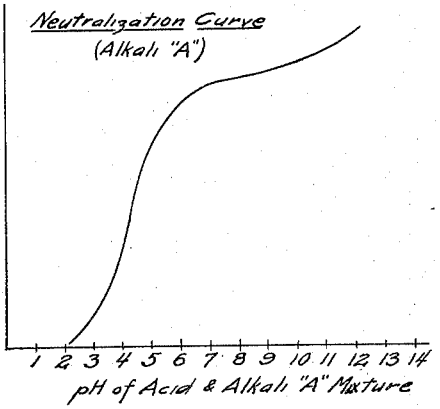
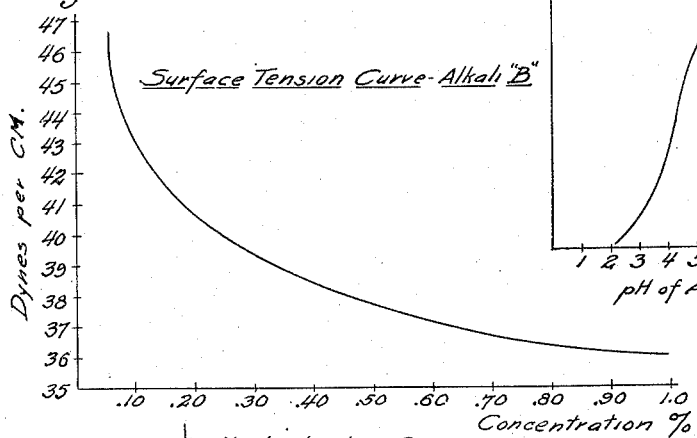
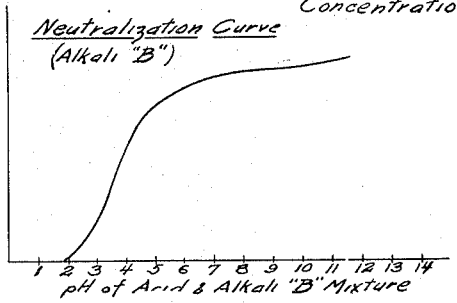
INVENTOR.
ROBERT B. BARRETT
BY
ATTORNEY

United States Patent Office 2,817,606
Patented Dec. 24, 1957

2,817,606

CLEANING PROCESS

Robert B. Barrett, Beloit, Wis., assignor to Klenzade Products, Inc., Beloit, Wis., a corporation of Wisconsin Application March 1, 1955, Serial No. 491,311

10 Claims. (Cl. 134—22)

This invention relates to a new and improved process for cleaning all types of dairy and food processing equipment, such as milking machines, evaporators, heat exchangers, pasteurizers and the like now in common use for processing milk and other foods.

The problem of cleaning and sanitizing this type of equipment, to maintain it in the required state of physical, chemical and bacteriological cleanliness, has long been a source of much concern to the dairy and food processing industries.

In many instances, the cleaning and sanitizing of the various forms of equipment used in the dairy and food processing industries have required the dismantling of various portions of the equipment and the effecting of the cleaning and sanitizing operations by hand methods. In other instances, in-place cleaning and sanitation have become common practice.

Since the output of any food processing plant is dependent upon the productive operating time of the equipment, any prolonged shut-down periods required for effecting the periodic cleansing and sanitizing of the equipment constitute a serious deterring factor in the output of the plant.

To the best of my knowledge, the most effective process for the cleaning and sanitizing of food processing equipment, prior to the present invention, was known as the Alternate System of Cleaning which comprised:

(1) The initial flushing of the equipment with clear water; followed by
(2) An acid treatment; followed by
(3) A thorough clear water rinsing; followed by
(4) An alkaline treatment; followed by
(5) Another clear water rinse; followed by
(6) A chlorinated sanitizing treatment.

The time, labor and material consumed in following this prolonged series of steps in the cleaning and sanitizing operations of the equipment frequently consumed several hours and has proved to be a rather costly procedure. While this process has many distinct advantages over the dismantling and hand-cleansing process, it still leaves much to be desired from the standpoint of time, labor and material efficiencies.

The primary object of the present invention resides in the provision of a new and improved process for the in-place cleaning of all forms of dairy and food processing equipment in a manner which will overcome the many inherent shortcomings of the previously known methods.

A further object of the invention resides in the provision of a new and improved process for the in-place cleaning and sanitizing of dairy and food processing equipment capable of accomplishing improved results more rapidly and effectively than were capable of accomplishment by any prior known method or process.

A further object of the invention resides in the provision of a new and improved process which not only improves the sanitation technique by reducing the time and labor required, but also affords the additional saving of material consumed in the form of steam, water and the amount of cleansing material required to meet the requisite high standards for cleaning and sanitizing of the many and varied forms of food processing equipment.

A further object of the invention resides in the discovery of a process in which an alkaline detergent is introduced directly into the initial organic acid detergent solution causing a reversion of the acids to their corresponding salts to provide varying degrees of organic sequestration which facilitates the improved effective operation of the cleaning process.

Another object of the invention resides in the discovery of a process in which the wetting agents in the organic acid detergent are re-used during the alkaline cleaning treatment to thereby institute a marked saving in the quantity of cleansing material required to produce the more rapid and effective cleansing of the equipment.

Another object of the invention resides in the discovery of a cleaning process in which the mixture of acid and alkaline components effects improved results through the reduction of the surface tension characteristics of the mixture.

Another object of the invention resides in the discovery of a cleaning process in which the addition of the alkaline detergent directly into the organic acid solution effects improved results by raising the pH of the organic acid solution from approximately 3 to a mixture having a pH of approximately 13 during the neutralizing action.

Other objects and advantages will become apparent from the following description of illustrative embodiments of the present invention.

In the drawing:

Figure 1 is a chart illustrating the surface tension curve of the organic acid solution utilized in carrying out the process of the present invention;

Fig. 2 is a chart illustrating the surface tension curve of an alkaline solution utilized in carrying out the process of the present invention;

Fig. 3 is a chart showing the neutralization curve resulting from the addition of the alkaline solution of Fig. 2 to that of the organic acid solution of Fig. 1;

Fig. 4 is a chart showing the surface tension curve of an alternate alkaline solution; and Fig. 5 is a chart, similar to Fig. 3, showing the neutralization curve when the alkaline solution of Fig. 4 is introduced into the organic acid solution illustrated in Fig. 1.

Before entering into a detailed discussion of the method and process of the present invention, it is deemed advisable to discuss some of the problems involved in the cleaning and sanitizing of food processing equipment. Various forms of soil manifest themselves in varying degrees during long continuous periods of operation of the equipment, in many instances up to twenty hours of continuous operation.

The soils accumulated and deposited during the operation of the equipment may generally be classified as:

(1) Water soluble soils in the forms of sugars, starches, certain proteins, and salts.

(2) Water insoluble soils in the form of:

a. Alkali soluble animal and vegetable fats;

b. Acid soluble limestone and milkstone deposits;

c. Acid and alkaline insoluble material such as organic fibre and carbon which may be held in suspension or removed by mechanical brushing; and d. Mineral oil which is removable only by organic solvents or emulsification.

Early materials in common use in the cleaning and sanitizing of food processing equipment were the well known caustic soda, soda ash and trisodium phosphates. Later complex or polyphosphates were utilized. With the advance of technical knowledge and the advent of detergents, having specific advantageous formulations, these latter materials provided a marked advance in the cleaning and sanitizing of food processing equipment.

Even with the advent of the various forms of detergents, the cleaning and sanitizing processes, although greatly advanced in effectiveness, left much to be desired from the standpoint of time and labor efficiencies.

The use of the cleaning process of the present invention provides greatly improved results coupled with the additional advantages of affording marked savings in time, labor and material over hitherto known and practiced processes for the cleaning and sanitizing of all forms of food processing equipment. One of the outstanding time saving features of the present cleaning process resides in the complete elimination of the rinsing step, previously deemed essential, between the acid and alkaline treatments of the equipment. Another advantage of the present process resides in the improved results obtainable by the direct addition of the alkaline material to the organic acid solution. This novel procedural step, which consists of the direct addition of the alkaline material to the organic acid solution, affords several advantageous purposes; firstly, it permits the re-use of the wetting agents in the organic acid solution, thus instituting a material saving in the cleansing materials required, secondly, it provides varying degrees of inorganic sequestration which prevents the precipitation of water hardness components, the presence of which frequently causes a film deposit on the equipment which is detrimental to the effective cleaning of the same and, thirdly, the direct addition of the alkaline material to the organic acid solution produces definite chelating effects during the process of neutralization to cause a reversion of the organic acid solution to the corresponding sodium salts which become effective water conditioning agents to thus facilitate the more rapid effective and economical cleaning of the equipment.

The chemical and physical characteristics of the organic acid detergent utilized, for the purpose of illustrating the present invention, comprises a liquid solution which consists of the following or equivalent ingredients combined substantially within the ranges of the following proportions:

(1) (2)
10%–70% organic acid such as citric, hydroxy acetic, diglycolic, gluconic, tartaric, maleic or equivalent acids;
15%– 1% nonionic wetting agent such as nonyl phenol ethylene oxide condensate;
20%– 4% anionic wetting agent such as alkyl aryl sulphonate; or
55%–25% water.

The above organic acid formula under column (2) provides:

pH 1% solution—2.73
pH .25% solution—3.30
Wetting speed, Draves test 25° C. in 1% solution 1 minute 24 seconds and affords a surface tension curve substantially as shown in Fig. 1 of the accompanying drawing.

The chemical and physical characteristics of the alkaline detergent "A" utilized for the purpose of illustrating the present invention, comprises a powdered compound which consists of the following or equivalent ingredients combined in substantially the following proportions:

(1) (2)
10%–50% caustic soda;
50%–20% sodium tripolyphosphate;
10%– 5% ethylene diaminetetra acetic acid salt; or other organic acid salts;
20%– 5% anionic wetting agent;
5%– 1% nonionic wetting agent; and
5%–19% sodium metasilicate.

The alkaline detergent "A," when in solution under column (2) provides:

pH 1% solution—12.56
pH .25% solution—11.74
Wetting speed, Draves test 25° C. in 1% solution 1 minute 6 seconds and affords a surface tension curve substantially as shown in Fig. 2 of the accompanying drawing.

The chemical and physical characteristics of the alternate alkaline detergent "B," utilized for the purpose of illustrating the present invention, comprises a powdered compound which consists of the following or equivalent ingredients combined in substantially the following proportions:

85.3% sodium hydroxide
10% tetrasodium pyrophosphate
0.7% nonionic wetting agent
4% basic sodium phosphates The alkaline detergent "B," when in solution provides:

pH 1% solution—12.65
pH .25% solution—11.91
Wetting speed, Draves test 25° C. in 1% solution—over 10 minutes and affords a surface tension curve substantially as shown in Fig. 4 of the accompanying drawing.

The process of cleaning high temperature short time equipment, in accordance with the teachings of the present invention, begins with the introduction of the organic acid solution having a pH of approximately 2.90 into the equipment and recirculating it through the equipment for approximately 30 to 45 minutes at a temperature slightly (5 to 10 degrees Fahrenheit) above the normal processing temperature to remove that portion of the soil which responds to the organic acid treatment. The alkaline detergent compound "A" is then added slowly and directly into the circulating organic acid solution and the mixture of organic acid solution and alkaline detergent is then recirculated through the equipment for approximately 30 to 45 minutes to remove the remaining soil from the equipment. The amount of alkaline detergent "A" required to neutralize one gallon of the organic acid solution to pH 11 comprises approximately 4 pounds. During the period of recirculation of the mixture of organic acid solution and the alkaline detergent, which are specially compounded to provide the optimum chelation activity during the cleaning cycle, the pH of the mixture rises to approximately 13 as indicated by the neutralization curve shown in Fig. 3 of the accompanying drawing.

A reversion of the organic acids to their corresponding sodium salts occurs during the neutralization of the organic acid solution by the direct addition of the alkaline detergent "A" in accordance with the pH neutralization curve shown in Fig. 3. The reversion of the organic acids to their corresponding salts provides varying degrees of the organic sequestration which has been found to be extremely beneficial in facilitating the removal of the remaining soil. Furthermore, the sequestering action on certain portions of interfering substances present in the hard water areas prevents precipitation of water hardness compounds which normally form a cleaning resistant film on the equipment; and thereby the sequestering action permits the balance of the cleaning material to be more effective to cause the more rapid and efficient removal of the soil from the equipment. The chelation values of the sodium salts of the organic acids which may be used in this process are as follows as reported in the literature of Chas. Pfizer & Co. on various interfering metallic ions found in natural water supplies.

| Parts Sequestered by 100 parts sequestering agent | Ion Sequestered | Sequestering Agent | pH Approx. |
|---|---|---|---|
| 8 | Calcium | Sodium citrate | 7 |
| 7 | Iron | do | 8 |
| 17 | Manganese | do | 10 |
| 8 | Barium | do | 7, 9, 11 |
| 1 | Calcium | Sodium gluconate | 5 to 11 |
| 19 | Iron | do | 7, 8 |

Other literature indicates the sequestration action of several organic acids on calcium ions as follows:

| Acid | Sequestering millimoles CaCl$_2$ Per Mole |
|---|---|
| Diglycolic | 170 |
| Gluconic | 90 |
| Malic | 35 |
| Glycolic (hydroxyacetic) | 6 |
| Levulinic | 5 |
| Maleic | 20 |

A general description of the procedural steps utilized in carrying out the cleaning and sanitizing of dairy and food processing equipment in accordance with the teachings of the present invention will serve to emphasize the marked advantages attainable over previously known methods and processes.

By way of illustrating the use of the present method and process, it will be described in conjunction with the cleaning of the high temperature short time plate type pasteurizer unit.

The process comprises the following steps:

(1.) Flush entire unit with cold water immediately after flow of milk stops;

(2.) Disconect flow diversion valve. Hook up circulating pump and solution tank to the unit. Turn off cooling water;

(3.) Add enough water to solution tank to give proper circulation; 20 to 30 gallons of water usually required;

(4.) Add 1 quart of organic acid solution and start circulating pump;

(5.) Set thermostatic control to maintain temperature approximately 5 to 10 degrees above the normal processing temperature usually recommended (approximately 170° F.);

(6.) Circulate the organic acid solution through the pasteurizer for approximately 30 to 45 minutes;

(7.) Add approximately 5 pounds of alkaline compound "A" slowly and directly into the organic acid solution;

(8.) Circulate cleaning solution comprising mixture of the organic acid and alkaline compound for approximately 30 to 45 minutes;

(9.) Turn off heat and place hot water hose in solution tank;

(10.) Turn discharge line to drain to dispose of the cleaning solution;

(11.) Thoroughly flush cleaning solution from unit;

(12.) Flush with cold water until properly cooled;

(13.) Dismantle and inspect; and (14.) After reassembling and just before use, sanitize by pumping through sufficient quantity of 200 p. p. m. available chlorine solution.

Another illustrative use of the present invention will describe its use in conjunction with the cleaning of a single effect evaporator unit utilizing alkali "B."

This process comprises the following steps:

(1.) Immediately after hot well is emptied, rinse thoroughly with tepid water at 100° F.;

(2.) Fill hot well with 300 gallons of warm water. Add 1 gallon of the organic acid solution and brush down sides of hot well with long handled brush and heat to a temperature of 190° F.;

(3.) Immediately after evaporator is emptied of milk rinse thoroughly with tepid water;

(4.) Close up evaporator and build up vacuum to 15 inches. Draw the organic acid solution into the evaporator in the same manner used in normal operating procedures. Turn steam on evaporator. Maintain temperature of 180° F. by adjusting vacuum to 15 inches. Circulate through evaporator for 20 to 30 minutes;

(5.) Refill hot well with 200 gallons of warm water and add 300 pounds of the alkali compound "B" and brush down sides of hot well with long handled brush and heat to 190° F.;

(6.) Draw the alkaline solution into the evaporator directly on top of the organic acid solution. Keep the steam on the evaporator and maintain temperature at 180° F. by adjusting the vacuum to 15 inches. Circulate the mixture through the evaporator for 20 to 30 minutes.

(7.) When the mixture of the organic acid and alkali "B" compound had circulated through the evaporator for 20 to 30 minutes, adjust the vacuum to 28 inches as quickly as possible. This will give more turbulence to the mixture and will also cool evaporator down to normal operating temperatures;

(8.) Turn steam off evaporator. Release vacuum. Discharge the cleaning solution to the drain;

(9.) Rinse steam chest and separator body immediately with tepid water until unit is properly cooled down; and (10.) Inspect.

For those skilled in the art, the foregoing illustration of the present process will serve adequately to emphasize the several marked advantages provided over the use of previously known methods.

The foregoing description and illustrative examples of the use of the present process will serve to emphasize the marked advantages afforded over previously known cleaning methods.

The following enumerated features of the present invention serve to point out its novelty and advantages:

(1) A marked saving in time resulting from the elimination of a rinsing step previously deemed essential;

(2) A marked saving in material required as the wetting agents in the organic acid solution are not wasted but are reused in the neutralization process;

(3) A marked improvement in results flowing from the direct addition of the alkaline compound to the organic acid solution which provides:

(a) The re-use of the wetting agents;

(b) Varying degrees of organic sequestration to preclude the precipitation of water hardness compounds; and (c) The advantageous reversion of the organic acid solution to the corresponding sodium salts.

While the invention has been described in considerable detail, in the foregoing specification, it is understood that it is to be broadly construed within the spirit and scope of the invention as hereinafter claimed.

I claim:

1. The method of cleaning food processing equipment which comprises the introduction and circulation of an organic acid solution through the equipment to effect the removal of portions of the soil deposit contained in the equipment followed by the introduction of an alkaline detergent selected from the group of caustic soda, sodium tripolyphosphate, sodium metasilicate, sodium hydroxide, tetrasodium pyrophosphate, and mixtures of the same directly into the organic acid solution and the recirculation of the mixture of organic acid solution and alkaline detergent to effect the removal of the remainder of the soil deposit.

2. The method of cleaning food processing equipment which comprises the introduction and circulation of an organic acid solution through the equipment at a temperature somewhat higher than the normal operating temperature of the equipment to effect the removal of that portion of the soil deposit which responds to the organic acid treatment followed by the introduction of an alkaline detergent selected from the group of caustic soda, sodium tripolyphosphate, sodium metasilicate, sodium hydroxide, tetrasodium pyrophosphate, and mixtures of the same directly into the organic acid solution and the recirculation of the mixture of organic acid solution and alkaline detergent at a temperature substantially equal to that of the original organic acid solution to effect the removal of the remainder of the soil deposit.

3. The method of cleaning food processing equipment which comprises the introduction and circulation of an organic acid solution through the equipment at a temperature somewhat higher than the normal operating temperature of the equipment for a period of time between 20 and 45 minutes to effect the removal of that portion of the soil deposit which responds to the organic acid treatment followed by the introduction of an alkaline detergent selected from the group of caustic soda, sodium tripolyphosphate, sodium metasilicate, sodium hydroxide, tetrasodium pyrophosphate, and mixtures of the same directly into the organic acid solution and the recirculation of the mixture of organic acid solution and alkaline detergent at a temperature substantially equal to that of the original organic acid solution for a period of from 20 to 45 minutes to effect the removal of the remainder of the soil deposit.

4. The method of cleaning food processing equipment which comprises the introduction and circulation of an organic acid solution having a pH of approximately 3 through the equipment to effect the removal of those portions of the soil deposit which are soluble in said organic acid solution followed by the introduction of an alkaline detergent selected from the group of caustic soda, sodium tripolyphosphate, sodium metasilicate, sodium hydroxide, tetrasodium pyrophosphate, and mixtures of the same directly into the organic acid solution to effect the raising of the pH of the mixture of organic acid solution and alkaline detergent to approximately 13 to effect the removal of the remainder of the soil deposit.

5. The method of cleaning food processing equipment which comprises the introduction and circulation of an organic acid solution through the equipment to effect the removal of that portion of the soil deposit which is soluble in said organic acid solution followed by the introduction of an alkaline detergent selected from the group of caustic soda, sodium tripolyphosphate, sodium metasilicate, sodium hydroxide, tetrasodium pyrophosphate, and mixtures of the same directly into the organic acid solution and the recirculation of the mixture of organic acid solution and alkaline detergent to cause varying degrees of organic sequestration and effect the removal of the remainder of the soil deposit.

6. The method of cleaning food processing equipment which comprises the introduction and circulation of an organic acid solution through the equipment to effect the removal of portions of the soil deposit contained in the equipment followed by the introduction of an alkaline detergent selected from the group of caustic soda, sodium tripolyphosphate, sodium metasilicate, sodium hydroxide, tetrasodium pyrophosphate, and mixtures of the same directly into the organic acid solution to effect the neutralization of said organic acid solution and simultaneously effect the reversion of said organic acid solution to its corresponding sodium salts to produce a sequestering action to effect the removal of the remainder of the soil deposit.

7. The method of cleaning food processing equipment which comprises the introduction and circulation of an organic acid solution containing a wetting agent through the equipment to effect the removal of that portion of the soil deposit which responds to organic acid treatment followed by the introduction of an alkaline detergent selected from the group of caustic soda, sodium tripolyphosphate, sodium metasilicate, sodium hydroxide, tetrasodium pyrophosphate, and mixtures of the same directly into the organic acid solution and the recirculation of said mixture to thereby effect the reuse of the wetting agent of said organic acid solution and cause varying degrees of sequestration and the reversion of said organic acid to corresponding salts to effect the removal of the remainder of the soil deposit.

8. The method of cleaning food processing equipment which comprises the introduction and circulation of an organic acid solution having a pH of approximately 3 through the equipment to effect the removal of that portion of the soil deposit which responds to organic acid treatment followed by the introduction of an alkaline detergent selected from the group of caustic soda, sodium tripolyphosphate, sodium metasilicate, sodium hydroxide, tetrasodium pyrophosphate, and mixtures of the same directly into the organic acid solution and the recirculation of the mixture of organic acid solution and alkaline detergent to effect the neutralization of said organic acid solution, the reversion of said organic acid solution to its corresponding salts and the raising of the pH of the mixture to approximately 13 to effect the removal of the remainder of the soil deposit.

9. The method of cleaning food processing equipment which comprises the introduction and circulation of an organic solution having a pH of approximately 3 through the equipment at a temperature somewhat higher than the normal operating temperature of the equipment to effect the removal of that portion of the soil deposit which responds to organic acid treatment followed by the introduction of an alkaline detergent selected from the group of caustic soda, sodium tripolyphosphate, sodium metasilicate, sodium hydroxide, tetrasodium pyrophosphate, and mixtures of the same directly into said organic acid solution and the recirculation of the mixture of organic acid solution and the alkaline detergent at a temperature substantially equal to that of the original organic acid solution to effect the neutralization of said organic acid solution and its reversion to its corresponding salts to effect the removal of the remainder of the soil deposit.

10. The method of cleaning food processing equipment which comprises the introduction and circulation of an organic acid solution having a pH of approximately 3 through the equipment for a period of time between 20 and 45 minutes to effect the removal of that portion of the soil deposit which is soluble in said organic acid solution followed by the introduction of an alkaline detergent selected from the group of caustic soda, sodium tripolyphosphate, sodium metasilicate, sodium hydroxide, tetrasodium pyrophosphate, and mixtures of the same directly into the organic acid solution to effect the neutralization of said organic acid solution, the reversion of said organic acid solution to its corresponding salts and the raising of the pH of the mixture of organic acid solution and alkaline detergent to approximately 13 whereby the remainder of the soil deposit is removed through the process of recirculation of the mixture of said organic acid solution and alkaline detergent through the equipment.

References Cited in the file of this patent

UNITED STATES PATENTS

| | | |
|---|---|---|
| 2,291,085 | Lehmkuhl | July 28, 1942 |
| 2,338,689 | Parker | Jan. 4, 1944 |

FOREIGN PATENTS

| | | |
|---|---|---|
| 488,972 | Great Britain | July 18, 1938 |